United States Patent
Arai et al.

(10) Patent No.: US 10,397,083 B2
(45) Date of Patent: Aug. 27, 2019

(54) TERMINAL DEVICE IDENTIFICATION SYSTEMS, METHODS, AND PROGRAMS

(71) Applicant: YAHOO JAPAN CORPORATION, Tokyo (JP)

(72) Inventors: Yosuke Arai, Tokyo (JP); Yuki Taki, Tokyo (JP); Naoki Ikeda, Tokyo (JP); Naoto Yamaguchi, Tokyo (JP); Yoshinori Takahashi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 144 days.

(21) Appl. No.: 15/018,494

(22) Filed: Feb. 8, 2016

(65) Prior Publication Data
US 2016/0277273 A1    Sep. 22, 2016

(30) Foreign Application Priority Data
Mar. 20, 2015   (JP) .................................. 2015-057287

(51) Int. Cl.
*H04L 12/26*   (2006.01)
*H04L 29/08*   (2006.01)

(52) U.S. Cl.
CPC .......... *H04L 43/0876* (2013.01); *H04L 67/02* (2013.01)

(58) Field of Classification Search
CPC ............................ H04L 43/0876; H04L 67/02
See application file for complete search history.

(56) References Cited

U.S. PATENT DOCUMENTS

| 8,495,195 | B1 * | 7/2013 | Abidogun | H04L 67/04 709/223 |
| 8,689,303 | B1 * | 4/2014 | Abidogun | H04L 63/08 709/223 |
| 8,856,869 | B1 * | 10/2014 | Brinskelle | H04L 63/08 726/12 |
| 8,943,309 | B1 * | 1/2015 | Schilder | H04L 9/00 713/155 |
| 9,081,746 | B1 * | 7/2015 | Helter | G06F 15/177 |
| 9,088,564 | B1 * | 7/2015 | Hobson | H04L 63/0807 |

(Continued)

FOREIGN PATENT DOCUMENTS

| JP | 2013-073455 A | 4/2013 |
| JP | 2014-026488 A | 2/2014 |

(Continued)

OTHER PUBLICATIONS

Jan. 5, 2016 Office Action issued in Japanese Patent Application No. 2015-057287.

(Continued)

*Primary Examiner* — Blake J Rubin
(74) *Attorney, Agent, or Firm* — Oliff PLC

(57) ABSTRACT

A terminal device according to the present invention includes an application and a browser. The application includes a providing unit that provides the browser that is instructed by the application to perform a predetermined process with terminal information that is used to identify a terminal device and that is acquired by the application. The browser includes a sending unit that sends terminal information that is provided by the providing unit in the application and cookie information that is associated with a predetermined server device to the predetermined server device.

10 Claims, 12 Drawing Sheets

(56) References Cited

U.S. PATENT DOCUMENTS

| | | | |
|---|---|---|---|
| 9,104,519 B1* | 8/2015 | Newstadt | G06F 8/65 |
| 9,237,138 B2* | 1/2016 | Bosworth | H04L 63/062 |
| 9,288,118 B1* | 3/2016 | Pattan | H04L 67/306 |
| 9,344,505 B1* | 5/2016 | Martin | H04L 67/146 |
| 2006/0294196 A1* | 12/2006 | Feirouz | G06F 17/30899 |
| | | | 709/217 |
| 2012/0042008 A1* | 2/2012 | Christianson | G06F 17/30887 |
| | | | 709/203 |
| 2013/0091554 A1* | 4/2013 | Kinoshita | G06Q 30/0241 |
| | | | 726/4 |
| 2013/0124606 A1* | 5/2013 | Carpenter | H04L 67/06 |
| | | | 709/203 |
| 2014/0047517 A1* | 2/2014 | Ding | H04L 12/1453 |
| | | | 726/5 |
| 2014/0068593 A1* | 3/2014 | McErlane | G06F 8/61 |
| | | | 717/171 |
| 2014/0082715 A1* | 3/2014 | Grajek | G06F 17/30876 |
| | | | 726/8 |
| 2014/0164111 A1* | 6/2014 | Rodriguez | G06Q 30/0255 |
| | | | 705/14.53 |
| 2014/0187149 A1* | 7/2014 | Lortz | H04W 4/008 |
| | | | 455/41.1 |
| 2014/0189808 A1* | 7/2014 | Mahaffey | H04L 63/083 |
| | | | 726/4 |
| 2014/0222963 A1* | 8/2014 | Gangadharan | H04L 65/1016 |
| | | | 709/219 |
| 2014/0237496 A1* | 8/2014 | Julian | H04N 21/44213 |
| | | | 725/13 |
| 2014/0278926 A1* | 9/2014 | Close | G06Q 30/0246 |
| | | | 705/14.45 |
| 2014/0278927 A1* | 9/2014 | Close | G06Q 30/0246 |
| | | | 705/14.45 |
| 2014/0317266 A1* | 10/2014 | Fuchs | G06Q 30/02 |
| | | | 709/224 |
| 2014/0324545 A1* | 10/2014 | Splaine | G06Q 30/0277 |
| | | | 705/7.33 |
| 2015/0019322 A1* | 1/2015 | Alla | G06Q 30/0242 |
| | | | 705/14.41 |
| 2015/0046848 A1* | 2/2015 | Vohra | H04M 1/72522 |
| | | | 715/760 |
| 2015/0058162 A1* | 2/2015 | Purves | H04L 67/306 |
| | | | 705/26.8 |
| 2015/0121462 A1* | 4/2015 | Courage | H04L 63/08 |
| | | | 726/4 |
| 2015/0134459 A1* | 5/2015 | Dipaola | G06Q 30/0261 |
| | | | 705/14.64 |
| 2015/0134956 A1* | 5/2015 | Stachura | H04L 63/0807 |
| | | | 713/168 |
| 2015/0242903 A1* | 8/2015 | Peebles | G06Q 30/0267 |
| | | | 705/14.64 |
| 2015/0310483 A1* | 10/2015 | Kent | G06Q 30/0246 |
| | | | 705/14.45 |
| 2015/0319252 A1* | 11/2015 | Momchilov | H04L 67/141 |
| | | | 709/223 |
| 2015/0341383 A1* | 11/2015 | Reddy | H04L 63/0245 |
| | | | 726/22 |
| 2016/0119319 A1* | 4/2016 | Hua | H04L 63/06 |
| | | | 726/9 |
| 2016/0148259 A1* | 5/2016 | Baek | H04W 4/21 |
| | | | 705/14.53 |
| 2016/0219027 A1* | 7/2016 | Kaplan | H04L 63/08 |
| 2016/0234318 A1* | 8/2016 | Fardig | H04L 67/02 |
| 2016/0261576 A1* | 9/2016 | Nivala | H04L 63/08 |
| 2016/0269898 A1* | 9/2016 | Kueh | H04W 12/06 |
| 2016/0314460 A1* | 10/2016 | Subramanian | G06Q 20/3674 |
| 2017/0111351 A1* | 4/2017 | Grajek | H04L 63/0815 |
| 2017/0132670 A1* | 5/2017 | Han | G06Q 30/0277 |
| 2017/0180797 A1* | 6/2017 | Splaine | H04N 21/44213 |

FOREIGN PATENT DOCUMENTS

| | | |
|---|---|---|
| JP | 2014-132443 A | 7/2014 |
| JP | 5580372 B2 | 8/2014 |
| WO | 2014/168816 A1 | 10/2014 |

OTHER PUBLICATIONS

Sep. 13, 2016 Office Action issued in Japanese Patent Application No. 2016-088062.

Jul. 25, 2017 Office Action issued in Japanese Patent Application No. 2017-005897.

* cited by examiner

| TERMINAL ID | OS | VERSION | ... |
|---|---|---|---|
| TID01 | XXX | 8.1.1 | ... |

| TERMINAL ID | COOKIE ID | ... |
|---|---|---|
| TID01 | CID11 | ... |
| TID02 | CID12 | ... |
| TID03 | CID13 | ... |
| ⋮ | ⋮ | ⋮ |

FIG.8

| COOKIE ID | COOKIE INFORMATION | ... |
|---|---|---|
| CID11 | COOKIE INFORMATION A | ... |
| CID12 | COOKIE INFORMATION B | ... |
| CID13 | COOKIE INFORMATION C | ... |
| ⋮ | ⋮ | ⋮ |

TERMINAL DEVICE IDENTIFICATION SYSTEMS, METHODS, AND PROGRAMS

CROSS-REFERENCE TO RELATED APPLICATION

The present application claims priority to and incorporates by reference the entire contents of Japanese Patent Application No. 2015-057287 filed in Japan on Mar. 20, 2015.

BACKGROUND OF THE INVENTION

1. Field of the Invention

The present invention relates to a terminal device, an information transmission method, and a non-transitory computer readable recording medium.

2. Description of the Related Art

In recent years, smart devices, such as smart phones, tablet terminals, and the like, are becoming widely used. Users who use terminal devices, such as these smart devices or the like, acquire information by using applications, web browsers, or the like, that are installed in the terminal devices. Thus, there is a provided technology that estimates a same terminal device on the basis of the information related to the terminal device that requests information to be acquired. For example, see Patent Document 1: Japanese Patent No. 5580372.

However, the conventional technology described above does not always enable to appropriately estimate the sameness of the terminal device and to appropriately associate information collected from the same terminal device. For example, even if information related to the terminal device is similar, the terminal device may possibly be a different terminal device and thus the information collected from the same terminal device is not always appropriately associated.

SUMMARY OF THE INVENTION

It is an object of the present invention to at least partially solve the problems in the conventional technology.

According to one aspect of an embodiment, a terminal device includes an application and a browser. The application includes a providing unit that provides the browser that is instructed by the application to perform a predetermined process with terminal information that is used to identify the terminal device and that is acquired by the application. The browser includes a sending unit that sends the terminal information provided by the providing unit and cookie information that is associated with a predetermined server device to the predetermined server device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic diagram illustrating a configuration example of a cookie information storing unit according to the embodiment;

DETAILED DESCRIPTION OF THE PREFERRED EMBODIMENTS

A mode (hereinafter, referred to as an "embodiment") for implementing a terminal device, an information transmission method, an information providing program, and an information transmission program according to the present invention will be described in detail below with reference to the drawings. Furthermore, note that the terminal device, the information transmission method, the information providing program, and the information transmission program according to the present invention are not limited to the embodiment. Furthermore, note that in the embodiments described below, the same components are denoted by the same reference signs and an overlapping description is omitted.

1. Association Process

Figure 1:
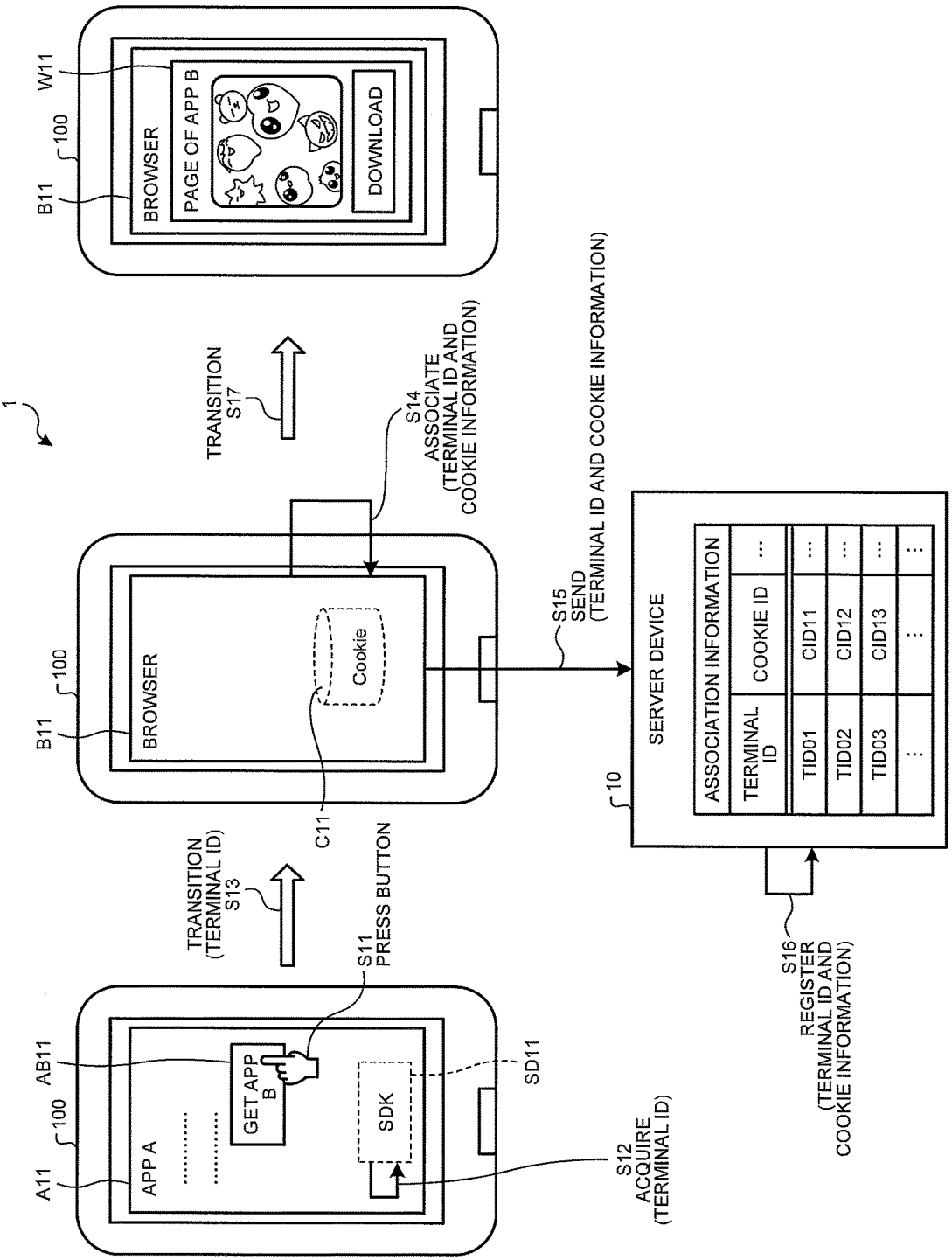
FIG. 1 is a schematic diagram illustrating an example of an association process according to an embodiment.
Figure 2:
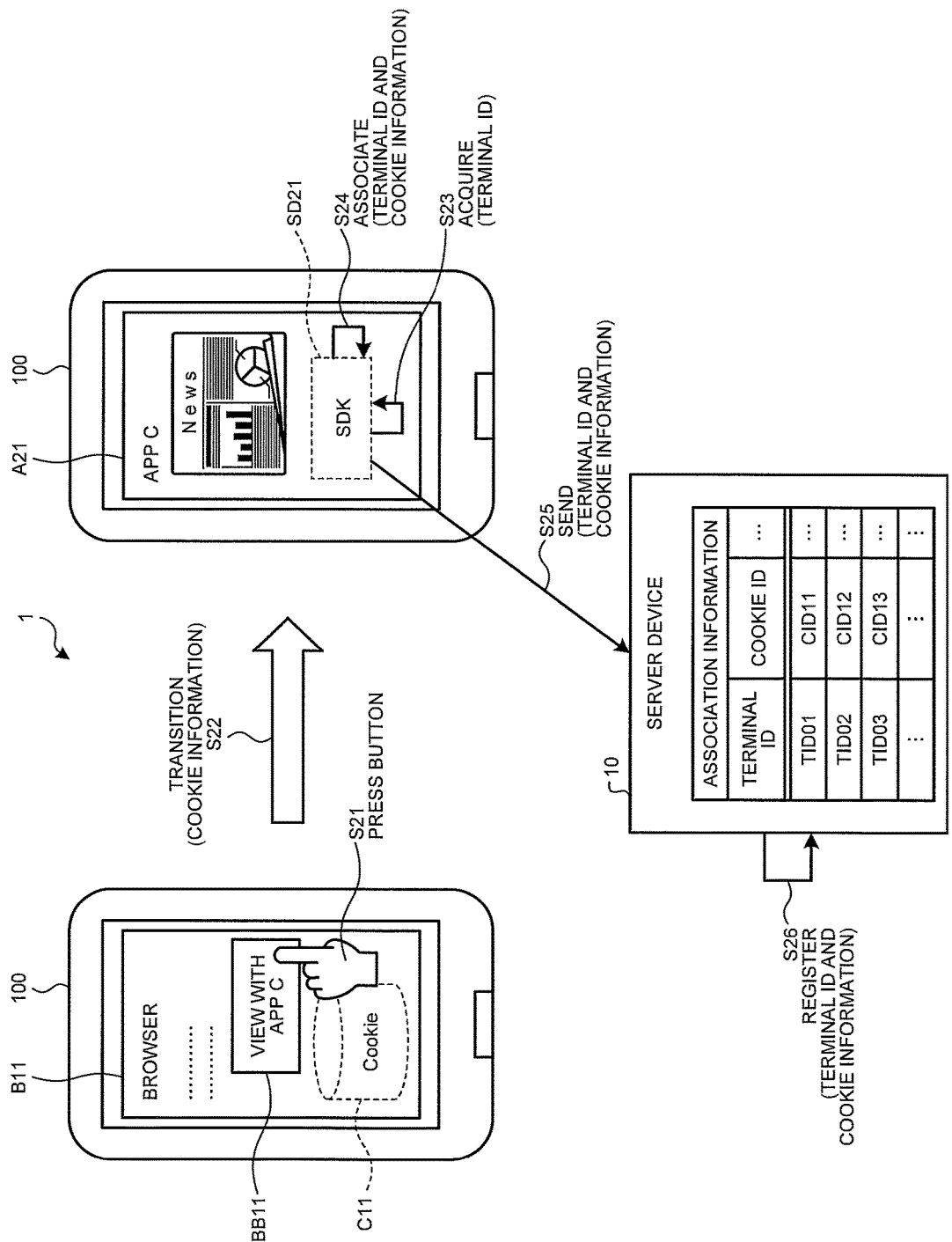
FIG. 2 is a schematic diagram illustrating an example of the association process according to the embodiment.

First, an example of an association process according to the embodiment will be described with reference to FIGS. 1 and 2. FIGS. 1 and 2 are schematic diagrams each illustrating an example of the association process according to the embodiment. Specifically, FIG. 1 is a schematic diagram illustrating an example of the association process when a transition from an application (hereinafter, sometimes be referred to as an "app") to a browser is performed. Furthermore, FIG. 2 is a schematic diagram illustrating an example of the association process when a transition from the browser to the app is performed. A terminal device 100 illustrated in FIGS. 1 and 2 sends, to a server device 10, the information (hereinafter, referred to as "association information") that is associated at the time of transition between the app and the browser.

As illustrated in FIGS. 1 and 2, an association system 1 includes a terminal device 100 and the server device 10. The terminal device 100 and the server device 10 are connected via a predetermined communication network, which is not illustrated, such that the terminal device 100 and the server device 10 can be communicated each other. Furthermore, in the association system 1 illustrated in FIGS. 1 and 2, a plurality of the terminal devices 100 or a plurality of the server devices 10 may also be included.

The terminal device 100 is an information processing apparatus that is used by a user. The terminal device 100 starts up, in accordance with an operation performed by the user, the app or the browser that are installed in the terminal device 100 and performs various kinds of processes. Furthermore, the terminal device 100 sends, to the server device 10, the information that is associated when a transition between an app and a browser is performed. Furthermore, in a description below, the terminal device 100 is sometimes referred to as a user. Namely, in a description below, the terminal device 100 can be read as a user. In the embodiment, a description will be given of case of using a smart phone as the terminal device 100. Furthermore, the terminal device 100 described above is not limited to a smart phone, but may also be, for example, a tablet type terminal, a notebook personal computer (PC), a desktop PC, a mobile phone device, a personal digital assistant (PDA), or the like.

The server device 10 is an information processing apparatus that performs the association process that registers the association information received from the terminal device 100. Furthermore, the server device 10 may also provide the association information to an external information processing apparatus, such as an advertisement distribution device. Furthermore, the server device 10 may also be an advertisement distribution device that performs advertisement distribution on the basis of the association information.

In the following, the association process when a transition from an app to a browser is performed will be described with reference to FIG. 1. In the terminal device 100 illustrated on the left side in FIG. 1, an app A (hereinafter, referred to as an "app A11") is started up and app A11 that is displayed on the terminal device 100. At this point, a predetermined software development kit (SDK) is included in the app A11 that is installed in the terminal device 100. Hereinafter, the SDK in the app A11 is referred to as a development kit SD11. Here, the development kit SD11 included in the app A11 can acquire the terminal information that is used to identify the terminal device 100 from a storing unit 120 (a terminal information storing unit 121) in the terminal device 100. Furthermore, the storing unit 120 and the terminal information storing unit 121 will be described in detail later. Hereinafter, the terminal information that is used to identify the terminal device 100 is referred to as a terminal ID.

As illustrated in FIG. 1, the user presses a button AB11 *n* the app A11 displayed on the terminal device 100 (Step S11). In the example illustrated in FIG. 1, the user presses the button AB11 that is represented by "get an app B" displayed on the terminal device 100. Then, the app A11 acquires the terminal ID from the terminal information storing unit 121 in the terminal device 100 (Step S12). Furthermore, the app A11 may also acquire the terminal ID before the process performed at Step S11.

After the button AB11 in the app A11 has been pressed, the state of the terminal device 100 is shifted, as a transition, from the app A11 to a browser B11 (Step S13). For example, if the browser B11 has not been started up, the terminal device 100 starts up the browser B11. Here, when the transition from the app A11 to the browser B11 is performed at Step S13, the app A11 provides the browser B11 with the terminal ID.

Then, in the example illustrated in FIG. 1, the browser B11 is displayed on the terminal device 100. Furthermore, the browser B11 associates the cookie information, which is extracted from a Hypertext Transfer Protocol (HTTP) Cookie (hereinafter, sometimes referred to as a "cookie") C11, with the terminal ID that is provided by the app A11 (Step S14). For example, the browser B11 extracts the cookie information related to the server device (hereinafter, sometimes simply referred to as a "server") specified by the app A11 and associates the extracted cookie information with the terminal ID that is provided by the app A11.

Then, the browser B11 sends, to the server device 10 as the association information, the terminal ID provided by the app A11 and the extracted cookie information (Step S15). Furthermore, when a transition from the app A11 to the browser B11 is performed, the browser B11 sends, to the server device 10, the cookie information and the terminal ID by using a function of, for example, a redirector or the like.

The server device 10 that has received the association information from the terminal device 100 registers the received association information (Step S16). For example, if the terminal ID included in the received association information has already been registered, the server device 10 adds the cookie information included in the received association information as the cookie information that is associated with the registered terminal ID. Specifically, if the terminal ID included in the received association information is "TID01", the server device 10 adds the cookie information included in the received association information as the cookie information that is associated with the registered terminal ID "TID01". Consequently, the server device 10 associates the terminal ID with the cookie information.

Furthermore, the terminal device 100 shifts, as a transition, the display of the browser B11 (Step S17). In the example illustrated in FIG. 1, a Web page W11 that urges a download of the app B is displayed on the browser B11. Furthermore, the process to be performed at Step S17 may also be simultaneously performed together with the process at Step S15 or may also be performed before the process at Step S15. Furthermore, instead of a transition of the display on the browser B11, the terminal device 100 may also start up an app that downloads the app B and then display the app that downloads the app B.

In the following, the association process performed when a transition from the browser to the app is performed will be described with reference to FIG. 2. In the terminal device 100 illustrated on the left side in FIG. 2, a browser is started up and the browser B11 is displayed on the terminal device 100.

As illustrated in FIG. 2, a user presses a button BB11 in the browser B11 displayed on the terminal device 100 (Step S21). In the example illustrated in FIG. 2, the user presses the button BB11 represented by "view with an app C" that is displayed on the terminal device 100.

After the button BB11 in the browser B11 is pressed, the terminal device 100 shifts, as a transition, from the browser B11 to the app C (hereinafter, referred to as an "app A21") (Step S22). For example, if the app A21 is not started up, the terminal device 100 starts up the app A21. Furthermore, if an Operating System (OS) of the terminal device 100 is the Android (registered trademark) or the iOS (registered trademark), the app A21 may also be started up by using the URL scheme. At this point, if a transition from the browser B11 to app A21 is performed at Step S22, the browser B11 provides the app A21 with the cookie information on the cookie C11. For example, the browser B11 may also extract, from the cookie C11, the cookie information that is related to the server and that is associated with the domain name of the Web page in which the button BB11 is displayed and may also provide the app A21 with the extracted cookie information.

Then, in the example illustrated in FIG. 2, an app A21 is displayed on the terminal device 100. If the app A21 is not installed in the terminal device 100, the terminal device 100 may also display a Web page that urges the browser B11 to install the app A21 or may also start up an app that urges installation of the app A21.

At this point, a predetermined SDK is included in the app A21 that is installed in the terminal device 100. Hereinafter, the SDK in the app A21 is referred to as a development kit SD21. Here, the development kit SD21 of the app A21 can acquire the terminal ID that is used to identify the terminal device 100 from the terminal information storing unit 121 in the terminal device 100.

After a transition from the browser B11 to the app A21 has been performed, the app A21 acquires the terminal ID from the terminal information storing unit 121 in the terminal device 100 (Step S23). The app A21 associates the cookie information provided from the browser B11 with the terminal ID acquired at Step S23 (Step S24).

Then, the app A21 sends, to the server device 10, the cookie information provided from the browser B11 and the terminal ID acquired at Step S23 as the association information (Step S25). Furthermore, when a transition from the browser B11 to the app A21 is performed, the app A21 sends, to the server device 10, the cookie information and the terminal ID by using, for example, the function performed by the development kit SD21 or the like.

The server device 10 that has received the association information from the terminal device 100 registers the received association information (Step S26). Consequently, the server device 10 associates the terminal ID with the cookie information.

As described above, in the association system 1 according to the embodiment, the terminal device 100 associates, when a transition between the app and the browser is performed, the terminal ID with the cookie information. The terminal device 100 sends the association information in which the terminal ID is associated with the cookie information to the server device 10. Consequently, the terminal device 100 can appropriately associate the information that is collected from the same terminal device 100.

Furthermore, the server device 10 registers the association information received from the terminal device 100. For example, if the terminal ID included in the received association information has already been registered, the server device 10 adds the cookie information included in the received association information as the cookie information that is associated with the registered terminal ID. Consequently, the server device 10 can associate the terminal ID with the cookie information. For example, the server device 10 provides the association information to an external information processing apparatus, for example, an advertisement distribution device included in the association system 1. Consequently, the association system 1 can perform an appropriate advertisement distribution with respect to a user. Thus, the association system 1 can increase the advertising effectiveness. Furthermore, the server device 10 may also be an advertisement distribution device that performs advertisement distribution on the basis of the association information. Consequently, the association system 1 can perform an appropriate advertisement distribution with respect to a user. Thus, the association system 1 can increase the advertisement effectiveness.

2. Configuration of the Terminal Device

Figure 3:
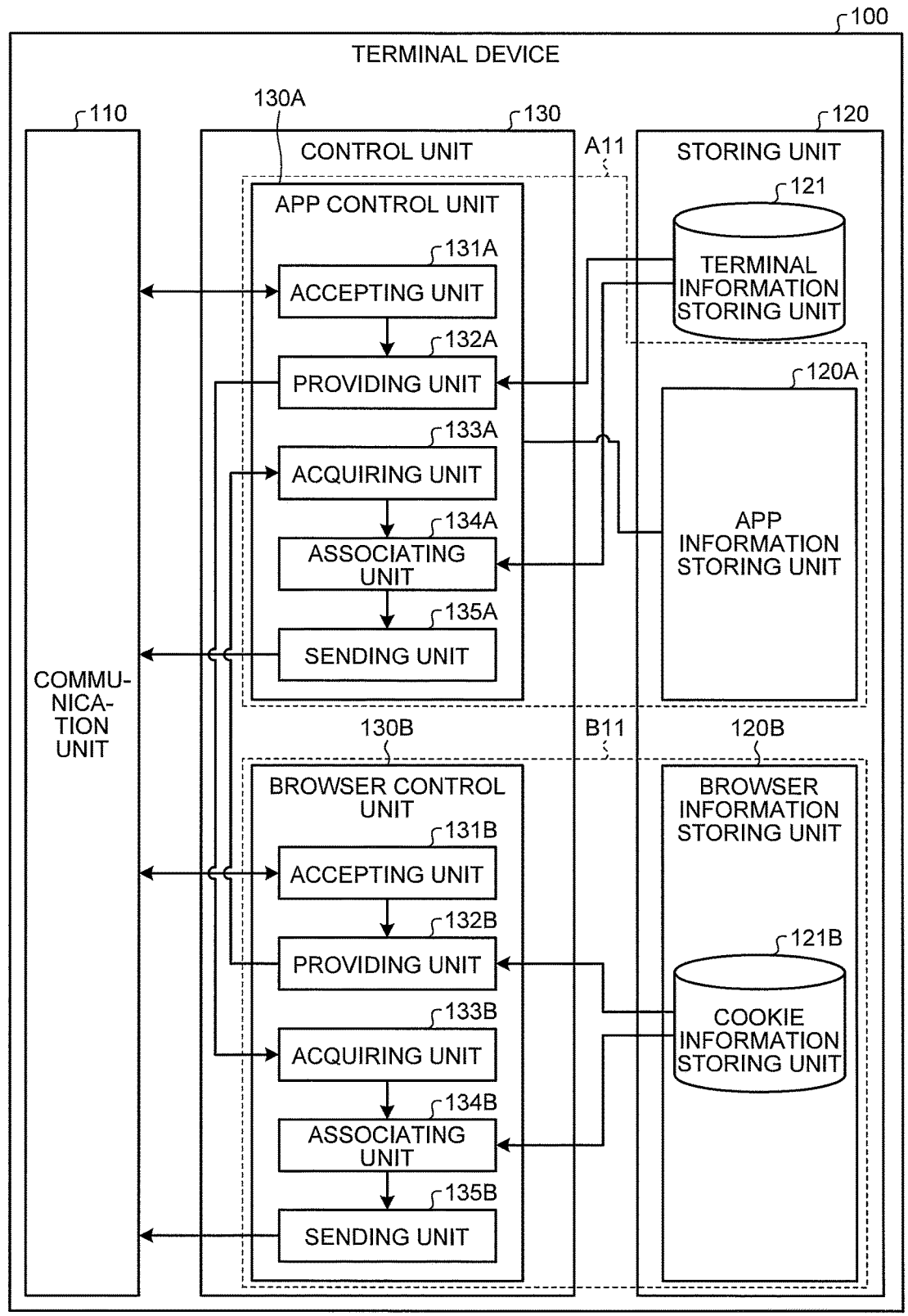
FIG. 3 is a schematic diagram illustrating a configuration example of a terminal device according to the embodiment.

In the following, the configuration of the terminal device 100 according to the embodiment will be described with reference to FIG. 3. FIG. 3 is a schematic diagram illustrating a configuration example of a terminal device according to the embodiment. As illustrated in FIG. 3, the terminal device 100 includes a communication unit 110, the storing unit 120, and a control unit 130. Furthermore, although not illustrated in the drawing, the terminal device 100 includes an input unit that accepts various kinds of operations from a user and an output unit that outputs various kinds of information. If, for example, the terminal device 100 has a touch panel function, the input unit accepts various kinds of operations from a user via a display screen on the terminal device 100. Furthermore, the output unit includes a display screen on the terminal device 100 implemented by, for example, a liquid crystal display, an organic electro luminescence (EL) display, or the like and displays various kinds of information.

The Communication Unit 110

The communication unit 110 is implemented by, for example, a communication circuit or the like. Then, the communication unit 110 is connected to a predetermined communication network (not illustrated) in a wired or a wireless manner and sends and receives information to and from the server device 10.

The Storing Unit 120

The storing unit 120 is implemented by, for example, a semiconductor memory device, such as a random access memory (RAM), a flash memory, and the like, or a storage device, such as a hard disk, an optical disk, and the like. The storing unit 120 stores, in the terminal device 100, for example, information related to the OS, such as programs or the like. The storing unit 120 according to the embodiment includes, as illustrated in FIG. 3, the terminal information storing unit 121, an app information storing unit 120A, and a browser information storing unit 120B.

The Terminal Information Storing Unit 121

Figures 4, 5:
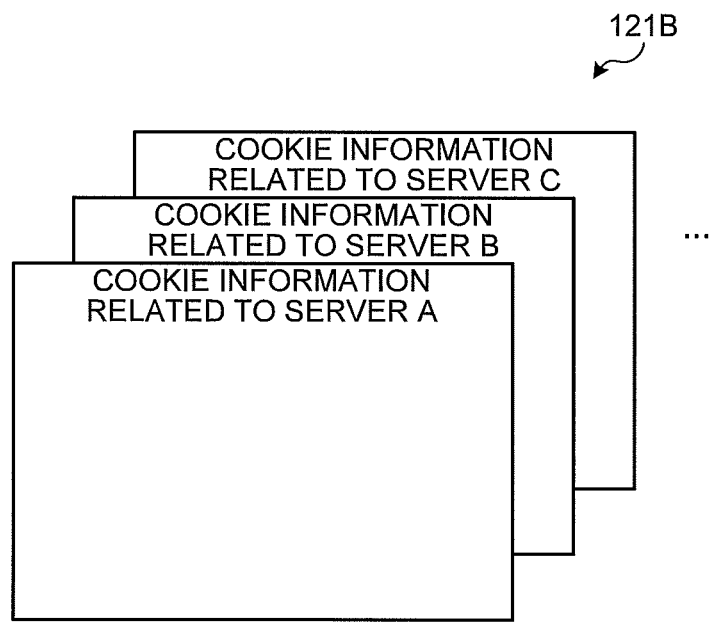
FIG. 4 is a schematic diagram illustrating an example of a terminal information storing unit according to the embodiment.
FIG. 5 is a schematic diagram illustrating an example of a cookie information storing unit according to the embodiment.

The terminal information storing unit 121 according to the embodiment stores therein various kinds of information related to the terminal device 100. FIG. 4 is a schematic diagram illustrating an example of a terminal information storing unit according to the embodiment. The terminal information storing unit 121 illustrated in FIG. 4 includes the items, such as the "terminal ID", the "OS", the "version", and the like.

The "terminal ID" indicates the identification information for identifying the terminal device 100. In the example illustrated in FIG. 4, "TID01" is stored as the terminal ID. Furthermore, the "OS" indicates the operating system (OS) installed in the terminal device 100. In the example illustrated in FIG. 4, "XXX" is stored as the OS. Namely, this indicates that the OS "XXX" is installed in the terminal device 100. Furthermore, the "version" indicates the version of the OS installed in the terminal device 100. In the example illustrated in FIG. 4, "8.1.1" is stored as the version. Namely, the OS "XXX" installed in the terminal device 100 has the version of "8.1.1". Furthermore, the information is not limited to the above described information. The terminal information storing unit 121 may also various kinds of information in accordance with the purpose as long as the information is related to the terminal device 100.

Furthermore, the app information storing unit 120A stores therein the information that is related to the application, such as programs or the like, that is installed in the terminal device 100. Furthermore, the browser information storing unit 120B stores therein the information, such as programs or the like, that is related to the browser installed in the terminal device 100. The browser information storing unit 120B includes a cookie information storing unit 121B. FIG. 5 is a schematic diagram illustrating an example of a cookie information storing unit according to the embodiment. As illustrated in FIG. 5, the cookie information storing unit 121B stores therein, for each server, the information related to a cookie in the browser. In the example illustrated in FIG. 5, the cookie information storing unit 121B stores therein, for each associated server (domain), cookie information, such as the cookie information related to a server A, the cookie information related to the server B, the cookie information related to the server C, or the like.

The Control Unit 130

A description will be given here by referring back to FIG. 3. The control unit 130 is implemented by, for example, the CPU, the MPU, or the like executing various kinds of programs (corresponding to an example of an information providing program or an information transmission program executed by the app or the browser installed in the terminal device 100), which are stored in the storage device, such as the storing unit 120, in the terminal device 100, by using a RAM as a work area. For example, an installed application program is included in these various kinds of programs. Furthermore, the control unit 130 is implemented by, for example, an integrated circuit, such as an ASIC, an FPGA, or the like.

As illustrated in FIG. 3, the control unit 130 includes an app control unit 130A and a browser control unit 130B. The internal configuration of the control unit 130 is not limited to the configuration illustrated in FIG. 3 but includes another configuration that implements the function performed, by the terminal device 100, as a smart phone.

The App Control Unit 130A

First, the app control unit 130A will be described. The app control unit 130A is a control unit that is associated with the app A11 and that performs the process, such as an association process or the like performed by the development kit SD11 included in the app A11 or the like, and various kinds of processes of the app A11. In the example illustrated in FIG. 3, it is assumed that the app control unit 130A and the app information storing unit 120A are associated with the app A11 and it is assumed that, for the other areas in the storing unit 120, an access is possible only in the area that is connected by a connecting cable.

The app control unit 130A includes, as particularly and closely related to the present invention, an accepting unit 131A, a providing unit 132A, an acquiring unit 133A, an associating unit 134A, and a sending unit 135A and implements or executes the function and the operation of the association process that will be described below. Furthermore, the internal configuration of the app control unit 130A is not limited to the configuration illustrated in FIG. 3 but may also be another configuration as long as the configuration in which the association process that will be described later is performed is used. Furthermore, the internal configuration of the app control unit 130A is not limited to the configuration illustrated in FIG. 3 but includes another configuration that is used to implement various kinds of processes performed by the app A11.

The accepting unit 131A accepts an instruction or information related to an application. For example, the accepting unit 131A accepts various kinds of operations from a user via the input unit. Furthermore, the accepting unit 131A accepts information or the like related to an update of the application via the communication unit 110.

The providing unit 132A provides the browser that is instructed by the application to perform a predetermined process with the terminal ID that is used to identify the terminal device 100 and that is acquired by the application. As illustrated in FIG. 3, the providing unit 132A accesses the terminal information storing unit 121 and acquires the terminal ID. For example, in the example illustrated in FIG. 1, when a transition from the app A11 to the browser B11 is performed, the providing unit 132A provides the browser B11 with the terminal ID.

If the acquiring unit 133A receives an instruction to perform a predetermined process from the browser, the acquiring unit 133A acquires the cookie information that is associated with the predetermined server device and that is provided from the browser. For example, when a transition from the browser B11 to the app A11 is performed, the acquiring unit 133A acquires the cookie information that is associated with the server device 10 and that is provided from the browser B11.

The associating unit 134A associates the cookie information acquired by the acquiring unit 133A with the terminal ID acquired from the terminal information storing unit 121. Furthermore, as illustrated in FIG. 3, the associating unit 134A accesses the terminal information storing unit 121 and acquires the terminal ID.

The sending unit 135A sends, to the server device 10, the cookie information and the terminal ID that are associated by the associating unit 134A as the association information.

Furthermore, in the example illustrated in FIG. 3, only the app control unit 130A and the app information storing unit 120A that are associated with the app A11 are illustrated; however, the terminal device 100 includes not only the app A11 but also an app control unit and an app information storing unit with respect to each app installed in the terminal device 100. For example, the terminal device 100 includes a plurality of app control units and app information storing units. Furthermore, the process, such as the association process or the like, performed by the app control unit 130A described above may also be implemented by, for example, JavaScript (registered trademark) or the like.

The Browser Control Unit 130B

First, the browser control unit 130B will be described. The browser control unit 130B is a control unit associated with the browser B11 and performs processes, such as the association process or the like, performed by the browser B11 or various kinds of processes of the browser B11. In the example illustrated in FIG. 3, the browser control unit 130B and the browser information storing unit 120B are associated with the browser B11 and, for the other areas in the storing unit 120, an access is possible only in the area that is connected by a connecting cable. Consequently, in the embodiment, the browser control unit 130B is not able to access the terminal information storing unit 121 and thus the terminal ID is not able to be acquired by the browser control unit 130B.

The browser control unit 130B includes, as particularly and closely related to the present invention, an accepting unit 131B, a providing unit 132B, an acquiring unit 133B, an associating unit 134B, and a sending unit 135B and implements or executes the function and the operation of the association process that will be described below. Furthermore, the internal configuration of the browser control unit 130B is not limited to the configuration illustrated in FIG. 3 but may also be another configuration as long as the configuration in which the association process that will be described later is performed is used. Furthermore, the internal configuration of the browser control unit 130B is not limited to the configuration illustrated in FIG. 3 but includes another configuration that is used to implement various kinds of processes performed by the browser B11.

The accepting unit 131B accepts an instruction or information related to a browser. For example, the accepting unit 131B accepts various kinds of operations from a user via the input unit. Furthermore, the accepting unit 131B accepts information or the like related to an update of the application via the communication unit 110.

The providing unit 132B provides the application that is instructed by the browser to perform the predetermined process with the cookie information that is associated with the predetermined server device. Furthermore, as illustrated in FIG. 3, the providing unit 132B accesses the cookie information storing unit 121B and acquires the cookie information associated with the predetermined server device. For example, in the example illustrated in FIG. 2, when a transition from the browser B11 to the app A21 is performed, the providing unit 132B provides the app A21 with the cookie information that is associated with the server device 10.

If the acquiring unit 133B receives an instruction to perform the predetermined process from the application, the acquiring unit 133B acquires the terminal ID that is used to identify the terminal device 100 and that is provided from the application. For example, when a transition from the app A11 to the browser B11 is performed, the acquiring unit 133B acquires the terminal ID that is provided from the app A11.

The associating unit 134B associates the terminal ID that is acquired by the acquiring unit 133B with the cookie information that is acquired from the cookie information storing unit 121B. Furthermore, as illustrated in FIG. 3, the associating unit 134B accesses the cookie information storing unit 121B and acquires the cookie information that is associated with the predetermined server device. For example, in the example illustrated in FIG. 1, when a transition from the app A11 to the browser B11 is performed, the associating unit 134B associates the terminal ID that is acquired by the acquiring unit 133B with the cookie information that is associated with the server device 10.

The sending unit 135B sends, to the server device 10, the cookie information and the terminal ID that are associated by the associating unit 134B as the association information.

Furthermore, in the example illustrated in FIG. 3, only the browser control unit 130B and the browser information storing unit 120B associated with the browser B11 are illustrated; however, the terminal device 100 includes not only the browser B11 but also a browser control unit and a browser information storing unit with respect to each browser installed in the terminal device 100. Furthermore, the process, such as the association process or the like, performed by the browser control unit 130B described above may also be implemented by, for example, JavaScript (registered trademark) or the like.

3. Configuration of the Server Device

Figures 6, 7:
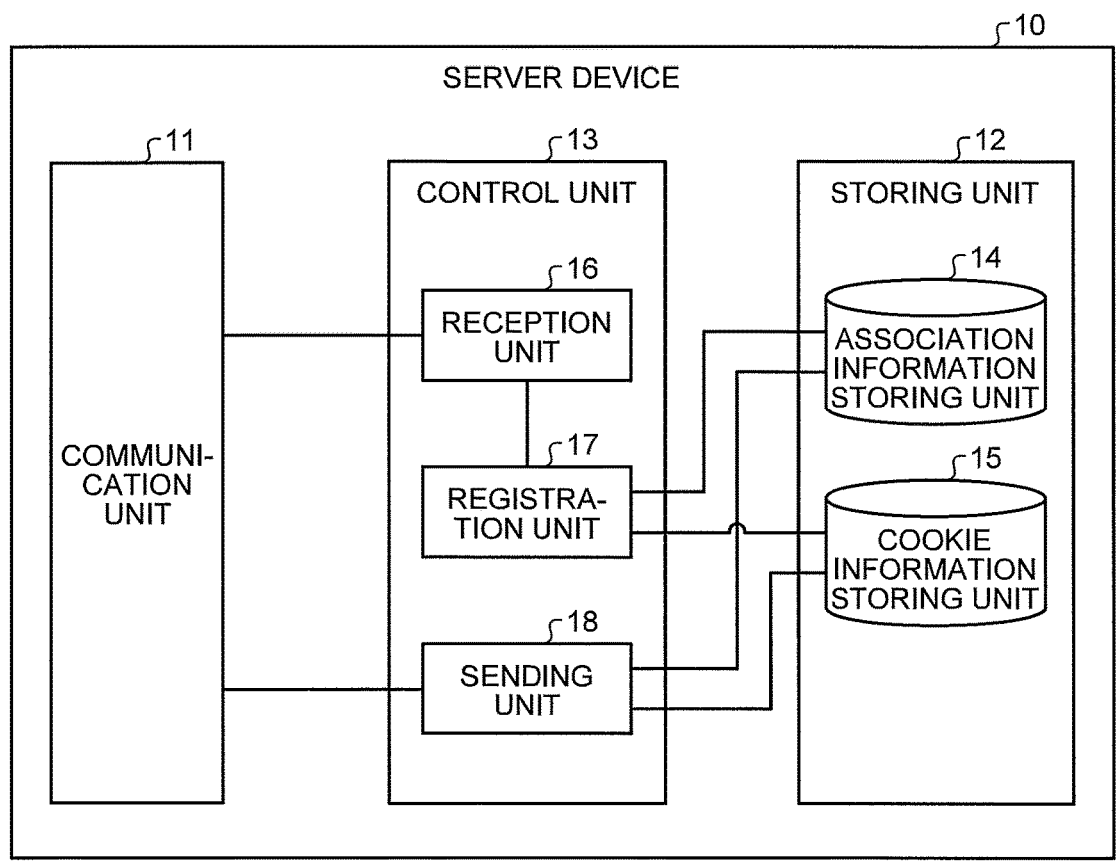
FIG. 6 is a schematic diagram illustrating a configuration example of a server device according to the embodiment.
FIG. 7 is a schematic diagram illustrating a configuration example of an association information storing unit according to the embodiment.

In the following, the configuration of the server device 10 according to the embodiment will be described with reference to FIG. 6. FIG. 6 is a schematic diagram illustrating a configuration example of a server device according to the embodiment. As illustrated in FIG. 6, the server device 10 includes a communication unit 11, a storing unit 12, and a control unit 13. Furthermore, the server device 10 may also include an input unit (for example, a keyboard, a mouse, or the like) that accepts various kinds of operations from, for example, an administrator of the server device 10 and may also include a displaying unit (for example, a liquid crystal display or the like) that is used to display various kinds of information.

The communication unit 11 is implemented by, for example, a NIC or the like. Then, the communication unit 11 is connected to the network in a wired or a wireless manner and sends and receives information to and from the terminal device 100.

The Storing Unit 12

The storing unit 12 is implemented by a semiconductor memory device, such as a RAM, a flash memory, and the like or a storage device, such as a hard disk, an optical disk, or the like. The storing unit 12 according to the embodiment includes, as illustrated in FIG. 6, an association information storing unit 14 and a cookie information storing unit 15.

The Association Information Storing Unit 14

The association information storing unit 14 according to the embodiment stores therein association information. For example, the association information storing unit 14 stores therein the association information received from the terminal device 100. FIG. 7 is a schematic diagram illustrating a configuration example of an association information storing unit according to the embodiment. The association information storing unit 14 illustrated in FIG. 7 includes items, such as the "terminal ID", "cookie ID", and the like.

The "terminal ID" indicates the identification information for identifying the terminal device 100. Furthermore, the "cookie ID" indicates the identification information for identifying the cookie information. In the example illustrated in FIG. 7, for the terminal ID "TID01", the cookie ID "CID11" is associated and stored; for the terminal ID "TID02", the cookie ID "CID12" is associated and stored; and, for the terminal ID "TID03", the cookie ID "CID13" is associated and stored. For example, the example illustrated in FIG. 7 indicates that the cookie information that is associated with the terminal ID "TID01" and the cookie ID "CID11" is received from the terminal device 100 as the association information.

The Cookie Information Storing Unit 15

The cookie information storing unit 15 according to the embodiment stores therein the cookie information. For example, the cookie information storing unit 15 associates the cookie information included in the association information received from the terminal device 100 with the cookie ID and stores the association relationship. FIG. 8 is a schematic diagram illustrating a configuration example of a cookie information storing unit according to the embodiment. The cookie information storing unit 15 illustrated in FIG. 8 has items, such as the "cookie ID", the "cookie information", and the like.

The "cookie ID" indicates the identification information for identifying the cookie information. The "cookie information" indicates the cookie information. In the example illustrated in FIG. 8, for cookie ID "CID11", the cookie information A is associated and stored; for the cookie ID "CID12", the cookie information B is associated and stored; and, for the cookie ID "CID13", the cookie information C is associated and stored. The examples illustrated in FIGS. 7 and 8 indicates that, for example, the cookie information A that is identified by the terminal ID "TID01" and the cookie ID "CID11" is received as the association information from the terminal device 100. Furthermore, the "cookie information" may also be a file path that indicates the area in which the associated cookie information is stored.

The Control Unit 13

A description will be given here by referring back to FIG. 6. The control unit 13 is implemented by, for example, the CPU, the MPU, or the like executing various kinds of programs, which are stored in the storage device in the server device 10, by using a RAM as a work area. Furthermore, the control unit 13 is implemented by, for example, an integrated circuit, such as an ASIC, an FPGA, or the like.

As illustrated in FIG. 6, the control unit 13 includes a reception unit 16, a registration unit 17, and a sending unit 18 and implements or executes the function or the operation of the information processing described below. Furthermore, the internal configuration of the control unit 13 is not limited to the configuration illustrated in FIG. 6. Another configuration may also be used as long as the configuration in which the information processing, which will be described later, is performed is used. Furthermore, the connection relation between the processing units included in the control unit 13 is not limited to the connection relation illustrated in FIG. 6 and another connection relation may also be used.

The reception unit 16 receives the association information from the terminal device 100. For example, the reception unit 16 receives, as the association information, the terminal ID and the cookie information that are received from the terminal device 100.

The registration unit 17 registers the association information that is received from the reception unit 16 in the association information storing unit 14 and the cookie information storing unit 15. For example, if the terminal ID that is included in the association information that is received from the terminal device 100 has already been registered in the association information storing unit 14, the registration unit 17 adds the cookie information that is included in the received association information as the cookie information that is associated with the registered terminal ID. Furthermore, if the terminal ID that is included in the association information that is received from the terminal device 100 has not been registered in the association information storing unit 14, the registration unit 17 associates the terminal ID with the cookie ID that is used to identify the cookie information and stores the associated cookie ID and the cookie information in the association information storing unit 14. Furthermore, the registration unit 17 associates the cookie information that is included in the association information that is received from the terminal device 100 with the cookie ID and then adds the associated cookie information and the cookie ID in the cookie information storing unit 15.

The sending unit 18 sends various kinds of information to an external information processing apparatus. For example, the sending unit 18 sends the association information to the advertisement distribution device. Furthermore, for example, the sending unit 18 may also send information that instructs the terminal device 100 to send the association information. Furthermore, if the server device 10 is a advertisement distribution device, the sending unit 18 may also distribute the advertisement based on the association information to the terminal device 10.

4. Flow of the Association Process

Figure 9:
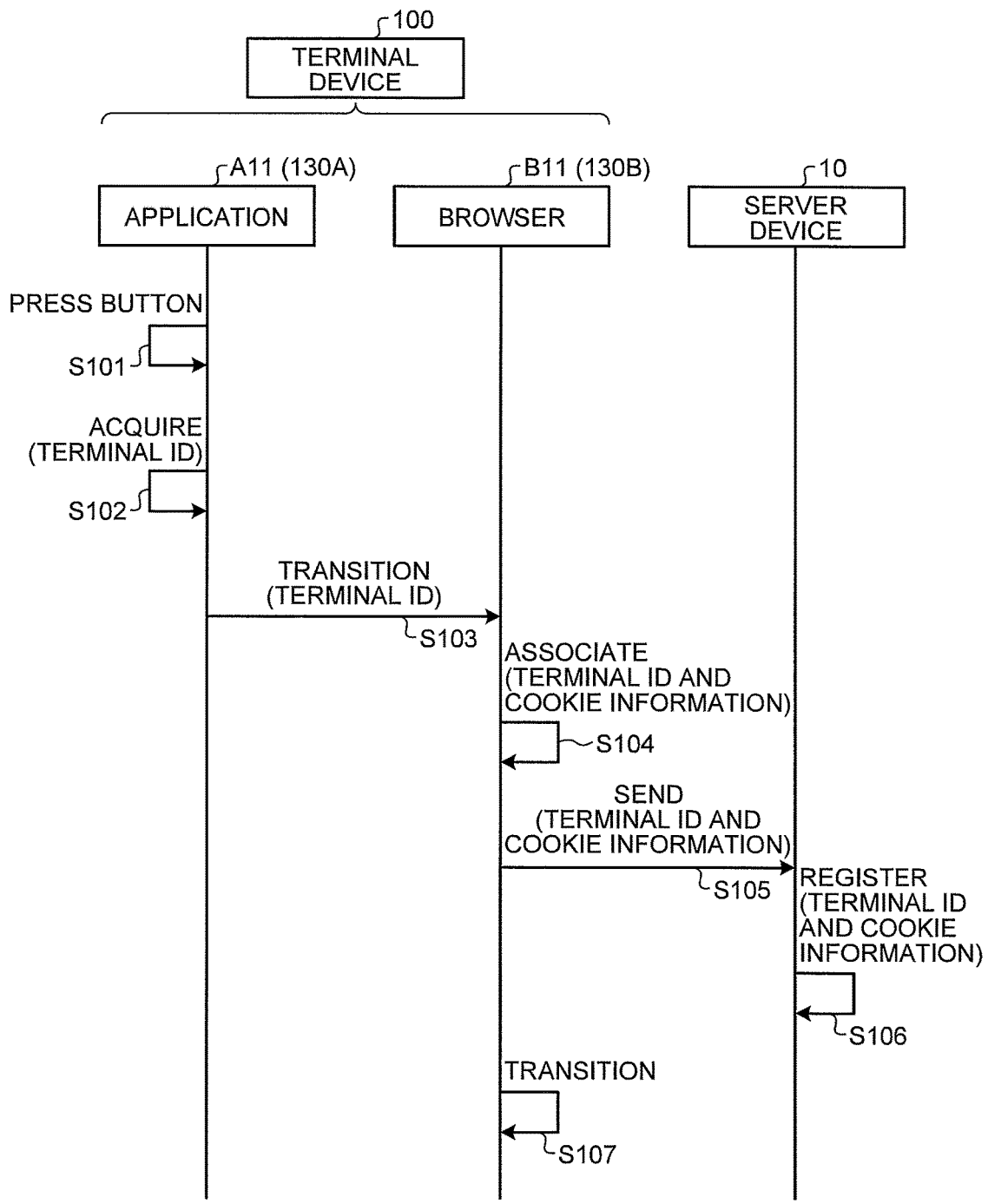
FIG. 9 is a sequence diagram illustrating the flow of the association process according to the embodiment.
Figure 10:
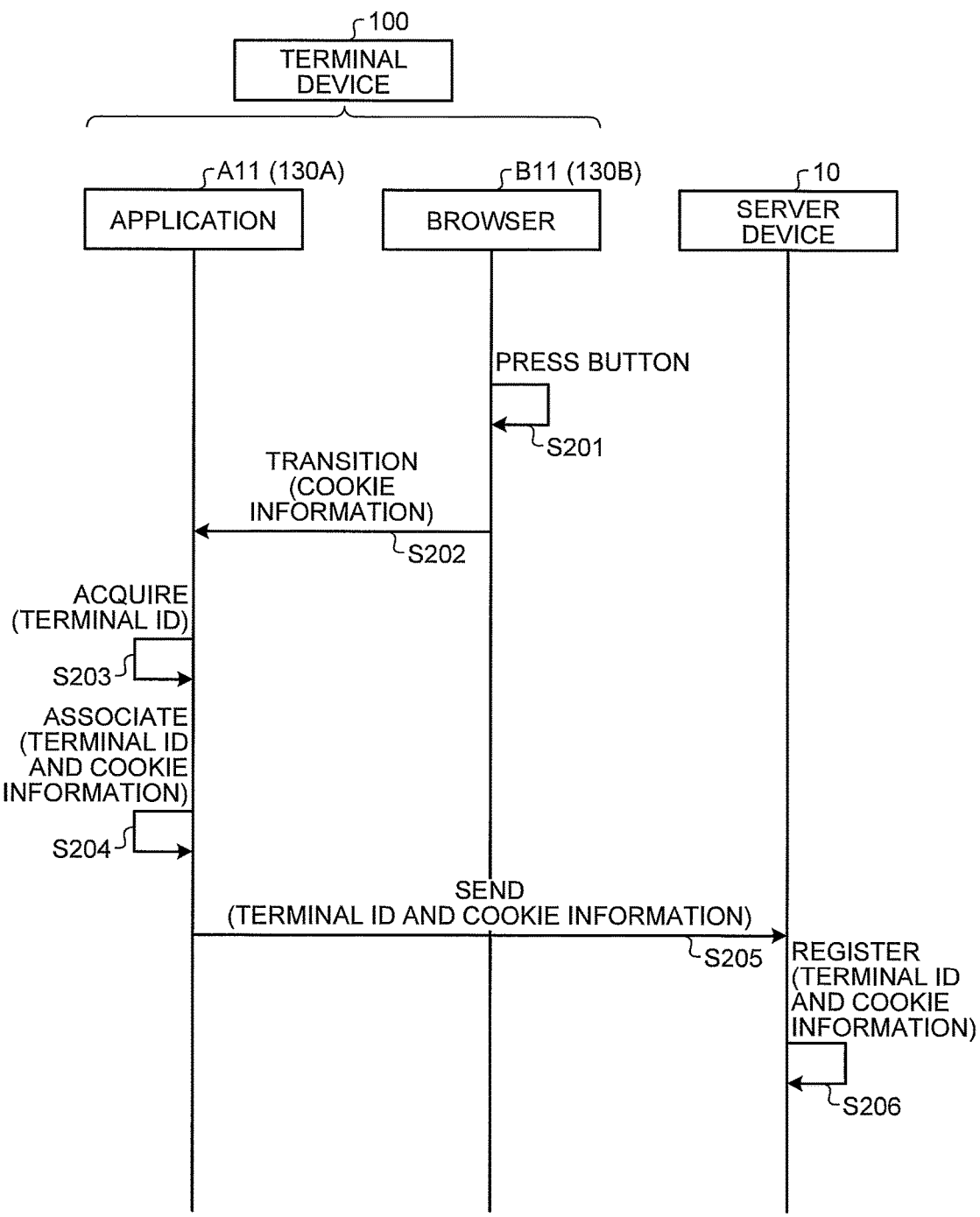
FIG. 10 is a sequence diagram illustrating the flow of the association process according to the embodiment.

In the following, the flow of the association process performed by the association system 1 according to the embodiment will be described with reference to FIGS. 9 and 10. FIGS. 9 and 10 are sequence diagrams each illustrating the flow of the association process performed by the association system 1 according to the embodiment. Specifically, FIG. 9 is a sequence diagram illustrating the flow of the association process when a transition from the app to the browser is performed. Furthermore, FIG. 10 is a sequence diagram illustrating the flow of the association process when a transition from the browser to the app is performed.

First, the flow of the association process when a transition from the app to the browser is performed will be described with reference to FIG. 9. As illustrated in FIG. 9, if a button is pressed (Step S101), the app A11 displayed on the terminal device 100 acquires the terminal ID from the terminal information storing unit 121 in the terminal device 100 (Step S102). Furthermore, the app A11 may also acquire the terminal ID before the process at Step S101 is performed.

Then, the terminal device 100 shifts, as a transition, from the app A11 to the browser B11 (Step S103). For example, if the browser B11 has not been started up, the terminal device 100 starts up the browser B11. At this point, when a transition from the app A11 to the browser B11 is performed at Step S13, the app A11 provides the browser B11 with the terminal ID.

Thereafter, the browser B11 is displayed on the terminal device 100. Then, the browser B11 associates the cookie information extracted from the cookie information storing unit 121B with the terminal ID provided from the app A11 at Step S103 (Step S104). For example, the browser B11 extracts the cookie information related to the server device 10 from the cookie information storing unit 121B and associates the extracted cookie information with the terminal ID provided by the app A11 at Step S103. Then, the browser B11 sets, as the association information, the terminal ID the cookie information that are associated at Step S104 and sends the association information to the server device 10 (Step S105).

Then, the server device 10 registers the association information received from the terminal device 100 (Step S106). For example, if the terminal ID included in the received association information has already been registered, the server device 10 adds the cookie information included in the received association information as the cookie information that is associated with the registered terminal ID.

Furthermore, the terminal device 100 shifts, as a transition, the display of the browser B11 (Step S107). Furthermore, the process performed at Step S107 may also simultaneously be performed together with the process performed at Step S105 or Step S106 or may also be performed before the process at Step S105 or Step S106.

In the following, the flow of the association process when a transition from the browser to the app is performed will be described with reference to FIG. 10. As illustrated in FIG. 10, if a button is pressed (Step S201), the browser B11 displayed on the terminal device 100 shifts, as a transition, from the browser B11 to the app A11 (Step S202). For example, if the app A11 has not been started up, the terminal device 100 starts up the app A11. At this point, if a transition from the browser B11 to the app A11 is performed at Step S202, the browser B11 provides the app A11 with the cookie information extracted from the cookie information storing unit 121B. For example, the browser B11 may also extract the cookie information related to the server device 10 from the cookie information storing unit 121B and provide the extracted cookie information to the app A11.

Then, the app A11 is displayed on the terminal device 100. Then, a transition from the browser B11 to the app A11 has been performed, the app A11 acquires the terminal ID from the terminal information storing unit 121 in the terminal device 100 (Step S203). The app A11 associates, at Step S202, the cookie information provided from the browser B11 with the terminal ID acquired at Step S203 (Step S204). Thereafter, the app A11 sets, as the association information, the terminal ID and the cookie information that are associated at Step S204 and sends the association information to the server device 10 (Step S205).

Then, the server device 10 registers the association information received from the terminal device 100 (Step S206). For example, if the terminal ID included in the received association information has already been registered, the server device 10 adds the cookie information included in the received association information as the cookie information that is associated with the registered terminal ID.

5. Association Process Performed at the Time of Initial Startup of an App

Figure 11:
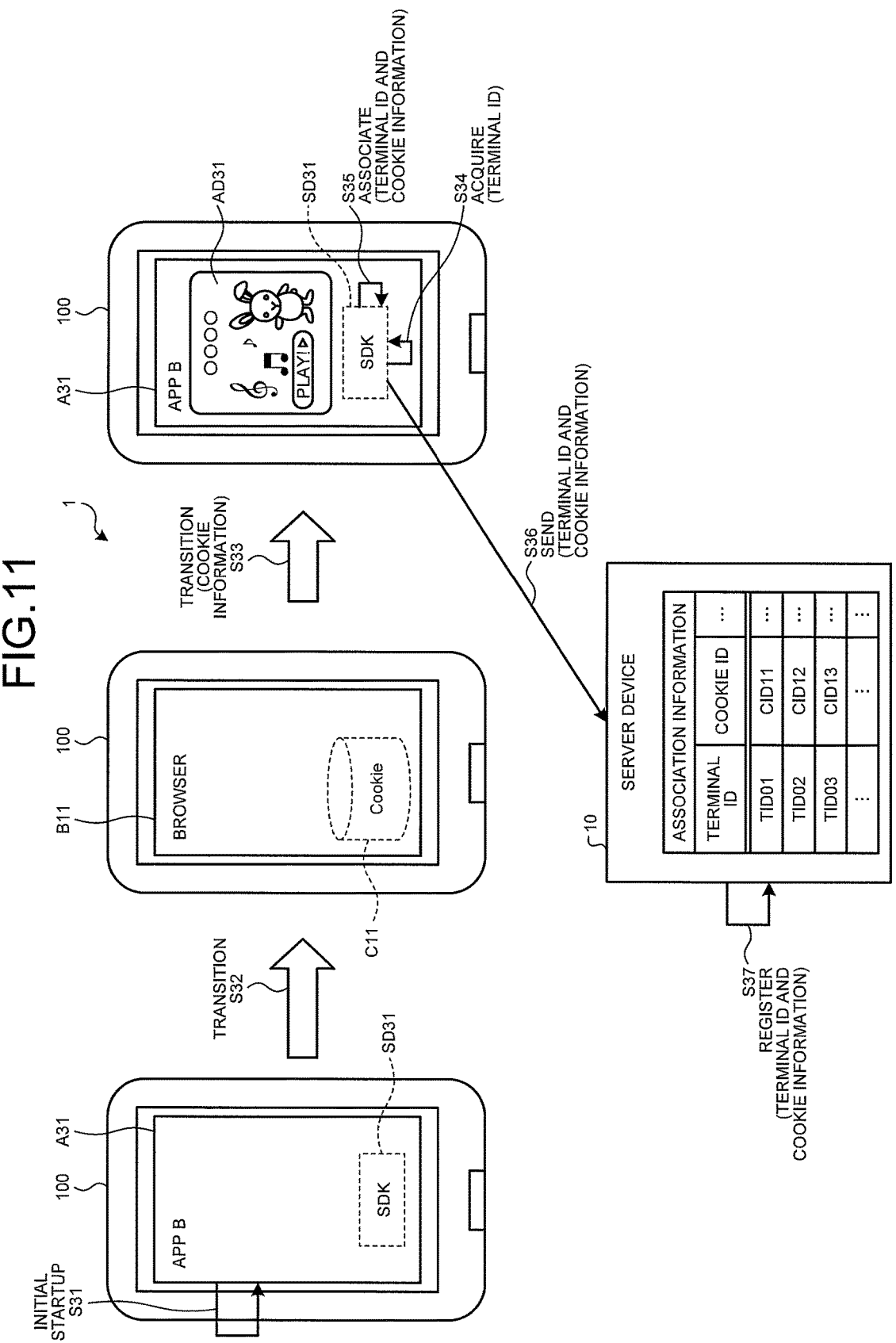
FIG. 11 is a schematic diagram illustrating an example of the association process performed at the time of initial stat up of an app according to the embodiment.

The association system 1 according to the embodiment may also perform the association process at the time of initial startup of an app in the terminal device 100. This point will be described with reference to FIG. 11. FIG. 11 is a schematic diagram illustrating an example of the association process performed at the time of initial startup of an app according to the embodiment.

First, in the terminal device 100 illustrated on the left side in FIG. 11, the app B (hereinafter, referred to as an "app A31") is started up first time (Step S31). For example, after the app A31 is installed in the terminal device 100, the initial startup of the app A31 is performed. At this point, a predetermined SDK is included in the app A31 that is initially started up in the terminal device 100. Hereinafter, the SDK in the app A31 is referred to as a development kit SD31. Here, the development kit SD31 in the app A31 can acquire the terminal ID that is used to identify the terminal device 100 from the terminal information storing unit 121 in the terminal device 100.

If the app A31 is initially started up in the terminal device 100, the terminal device 100 shifts, as a transition, from the app A31 to the browser B11 (Step S32). For example, if the browser B11 is not started up, the terminal device 100 starts up the browser B11.

Then, the terminal device 100 shifts, as a transition, from the browser B11 to the app A31 (Step S33). At this point, if a transition from the browser B11 to the app A31 is performed at Step S33, the browser B11 provides the app A31 with the cookie information on the cookie C11. For example, the browser B11 may also extract the cookie information related to the server device 10 from the cookie C11 and provide the extracted cookie information to the app A31.

Thereafter, in the example illustrated in FIG. 11, a start screen AD31 of the app A31 is displayed on the terminal device 100. After a transition from the browser B11 to the app A31 is performed, the app A31 acquires the terminal ID from the terminal information storing unit 121 in the terminal device 100 (Step S34). Then, the app A31 associates the cookie information provided from the browser B11 with the terminal ID acquired at Step S34 (Step S35).

Then, the app A31 sends, as the association information, the cookie information provided from the browser B11 and the terminal ID acquired at Step S34 to the server device 10 (Step S36). Furthermore, when a transition from the browser B11 to the app A31 is performed, the app A31 sends the cookie information and the terminal ID to the server device 10 by using, for example, the development kit SD31 or the like.

The server device 10 that received the association information from the terminal device 100 registers the received association information (Step S37). Consequently, the server device 10 also associates the terminal ID with the cookie information at the time of initial startup of the app.

6. Modification

The association system 1 according to the embodiment described above may also be performed with various kinds of embodiments other than the embodiment described above. For example, an association system 2 according to a modification performs the association process on also the cookie information in an in-app browser that is the browser included in the app. This point will be described with reference to FIGS. 12 and 13. Furthermore, same reference signs are assigned to the same components as that described in the embodiment and descriptions thereof will be omitted.

Figure 12:
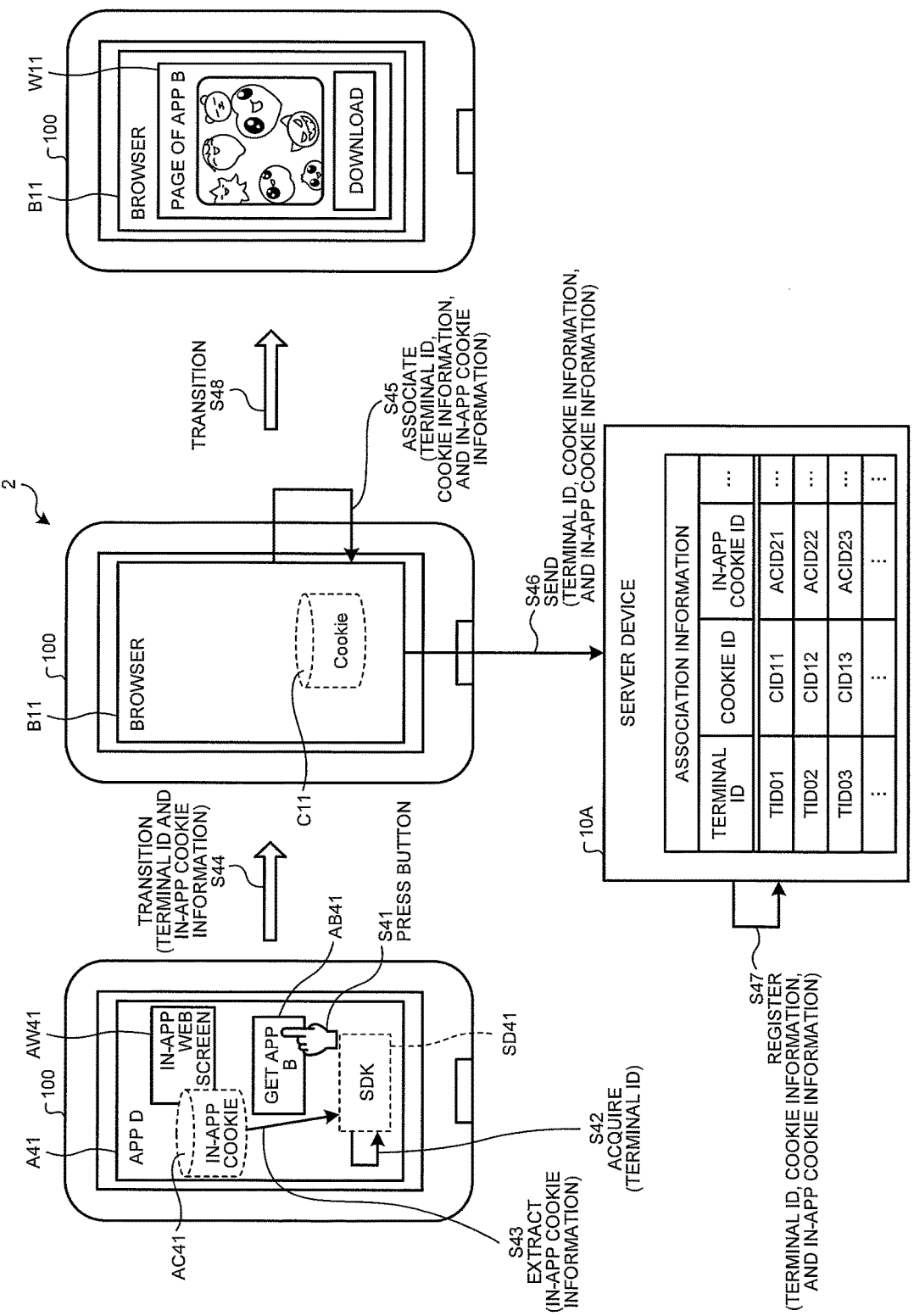
FIG. 12 is a schematic diagram illustrating an example of an association process according to a modification.
Figure 13:
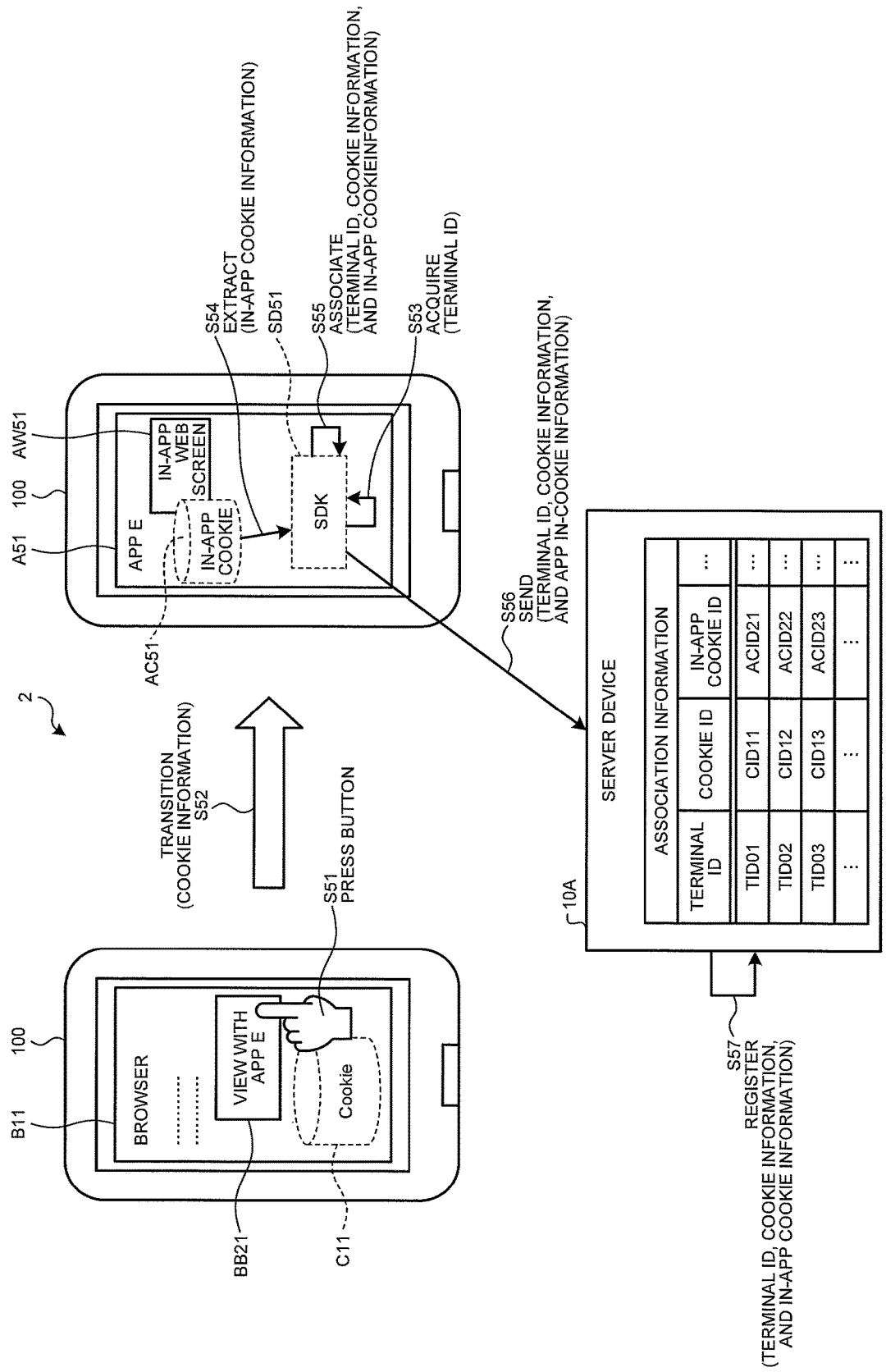
FIG. 13 is a schematic diagram illustrating an example of the association process according to the modification.

FIGS. 12 and 13 are schematic diagrams each illustrating an example of an association process according to a modification. Specifically, FIG. 12 is a schematic diagram illustrating an example of an association process including the cookie information in the in-app browser when a transition from the app to the browser is performed. FIG. 13 is a schematic diagram illustrating an example of an association process including the cookie information in the in-app browser when a transition from the browser to the app is performed. The terminal device 100 illustrated in FIGS. 12 and 13 sends, to a server device 10A, the association information that is associated when a transition between the app and the browser is performed. Furthermore, regarding the server device 10A illustrated in FIGS. 12 and 13, the configuration of the server device 10A is the same as that of the server device 10 according to the embodiment except that the cookie ID in the app is associated with the terminal ID as association information.

First, an association process including the cookie information in a browser in an app when a transition from the app to the browser is performed will be described with reference to FIG. 12. In the terminal device 100 illustrated on the left side in FIG. 12, the app D (hereinafter, referred to as an "app A41") has been started up and the app A41 is displayed on the terminal device 100. At this point, a predetermined SDK is included in the app A41 that is installed in the terminal device 100. Hereinafter, the SDK in the app A41 is referred to as a development kit SD41. Here, the development kit SD41 in the app A41 can acquire the terminal ID that is used to identify the terminal device 100 from the terminal information storing unit 121 in the terminal device 100.

Furthermore, a browser in the app is included in the app A41. In the terminal device 100 illustrated on the left side in FIG. 12, an in-app Web screen AW41 is displayed due to the function of the browser in an app. In the app information storing unit associated with the app A41 in the storing unit 120, an in-app Cookie AC41 in the app browser (hereinafter, referred to as an "in-app cookie") is stored.

As illustrated in FIG. 12, a user presses a button AB41 in the app A41 displayed on the terminal device 100 (Step S41). In the example illustrated in FIG. 12, the user presses the button AB41 representing "get an app B" displayed on the terminal device 100. Then, the app A41 acquires the terminal ID from the terminal information storing unit 121 in the terminal device 100 (Step S42). Then, the app A41 extracts in-app cookie information from the in-app cookie AC41 (Step S43). Furthermore, the app A41 may also acquire the terminal ID or the in-app cookie information before the process performed at Step S41. Furthermore, the app A41 may also perform the process at Step S43 before the process at Step S42.

After the button AB41 in the app A41 is pressed, the state of the terminal device 100 is shifted, as a transition, from the app A41 to the browser B11 (Step S44). For example, if the browser B11 has not been started up, the terminal device 100 starts up the browser B11. At this point, a transition from the app A41 to the browser B11 is performed at Step S44, the app A41 provides the browser B11 with the terminal ID and the in-app cookie information.

Then, in the example illustrated in FIG. 12, the browser B11 is displayed on the terminal device 100. Then, the browser B11 associates the cookie information extracted from the cookie C11 with both the terminal ID and the in-app cookie information provided by the app A41 (Step S45). For example, the browser B11 extracts the cookie information related to the server that is specified by the app A41 and associates the extracted cookie information with the terminal ID and the in-app cookie information provided by the app A41.

Then, the browser B11 sets, as the association information, the terminal ID and the in-app cookie information, which are provided by the app A41, and the extracted cookie information to the server device 10A (Step S46). Furthermore, when a transition from the app A41 to the browser B11 is performed, the browser B11 sends the terminal ID, the cookie information, and the in-app cookie information to the server device 10A by using, for example, a redirector or the like.

The server device 10A that has received the association information from the terminal device 100 registers the received association information (Step S47). For example, if the terminal ID included in the received association information has already been registered, the server device 10A adds the cookie information included in the received association information as the cookie information that is associated with the registered terminal ID. Furthermore, for example, if the terminal ID included in the received association information has already been registered, the server device 10A adds the in-app cookie information included in the received association information as the in-app cookie information that is associated with the registered terminal ID.

Furthermore, the terminal device 100 shifts, as a transition, the display of the browser B11 (Step S48). In the example illustrated in FIG. 12, the Web page W11 that urges the download of the app B is displayed on the browser B11. Furthermore, the process at Step S48 may also simultaneously be performed together with the processes at Step S46 and Step S47 or may also be performed before the processes at Step S46 and Step S47.

In the following, the association process including the cookie information in the in-app browser when a transition from the browser to the app is performed will be described with reference to FIG. 13. In the terminal device 100 illustrated on the left side in FIG. 13, the browser has been started up and browser B11 is displayed on the terminal device 100.

As illustrated in FIG. 13, a user presses a button BB21 in the browser B11 displayed on the terminal device 100 (Step S51). In the example illustrated in FIG. 13, the user presses the button BB21 represented by "view with an app E" that is displayed on the terminal device 100.

After the button BB21 in the browser B11 has been pressed, the terminal device 100 shifts, as a transition, from the browser B11 to the app E (hereinafter, referred to as an "app A51") (Step S52). For example, if the app A51 has not been started up, the terminal device 100 starts up the app A51. At this point, when the state is shifted, as a transition, from the browser B11 to the app A51 at Step S52, the browser B11 provides the app A51 with the cookie information on the cookie C11. For example, the browser B11 may also extract the cookie information related to the server device 10A from the cookie C11 and provide the app A51 with the extracted cookie information.

Then, in the example illustrated in FIG. 13, the app A51 is displayed on the terminal device 100. Furthermore, if the app A51 is not installed in the terminal device 100, the terminal device 100 may also display, on the browser B11, the Web page that urges the installation of the app A51 or may also start up an app that urges the installation of the app A51.

At this point, a predetermined SDK is included in the app A51 that is installed in the terminal device 100. Hereinafter, the SDK in the app A51 is referred to as a development kit SD51. Here, the development kit SD51 in the app A51 can acquire the terminal ID that is used to identify the terminal device 100 from the terminal information storing unit 121 in the terminal device 100.

Furthermore, an in-app browser is included in the app A51 and an in-app Web screen AW51 is displayed, by using the function of the in-app browser, on the terminal device 100 illustrated on the right side in FIG. 13. The in-app cookie AC51 in the in-app browser is stored, in the app information storing unit in the storing unit 120, at the position associated with the app A51.

After the state has been shifted, as a transition, from the browser B11 to the app A51, the app A51 acquires the terminal ID from the terminal information storing unit 121 in the terminal device 100 (Step S53). Furthermore, the app A51 extracts the in-app cookie information from the in-app cookie AC51 (Step S54). Furthermore, the process at Step S54 may also be performed before the process at Step S53. Then, the app A51 associates the cookie information that is provided by the browser B11 at Step S52, the terminal ID that is acquired at Step S53, and the in-app cookie information that is extracted at Step S54 (Step S55).

Then, the app A51 sends the terminal ID, the cookie information, and the in-app cookie information that are associated at Step S55 to the server device 10A as the association information (Step S56). Furthermore, when the state is shifted, as a transition, from the browser B11 to the app A51, the app A51 sends the cookie information and the terminal ID to the server device 10A by using the function of, for example, the development kit SD51 or the like.

The server device 10A that has received the association information from the terminal device 100 registers the received association information (Step S57). Consequently, the server device 10A associates the terminal ID, the cookie information, and the in-app cookie information.

7. Effects

As described above, the terminal device 100 according to the embodiment includes the application A11 (130A) and the browser B11 (130B). The application A11 includes the providing unit 132A that provides the browser B11 that is instructed by the application A11 to perform the predetermined process with the terminal information that is used to identify the terminal device 100 and that is acquired by the application A11. Furthermore, the browser B11 includes the sending unit 135B that sends, to the predetermined server device 10, the terminal information (in the embodiment, the "terminal ID". The same also applies to the description below.) provided by the providing unit 132A and the cookie information that is associated with the predetermined server device 10.

Consequently, the terminal device 100 according to the embodiment can appropriately associates the information collected from the same terminal device. Furthermore, the server device 10 can associate the terminal ID with the cookie information. For example, the server device 10 provides the association information to an external information processing apparatus, for example, the advertisement distribution device included in the association system 1. Consequently, the association system 1 can perform an appropriate advertisement distribution with respect to a user. Thus, the association system 1 can increase the advertisement effectiveness. Furthermore, the server device 10 may also be an advertisement distribution device that performs an advertisement distribution on the basis of the association information. Consequently, the association system 1 can perform an appropriate advertisement distribution with respect to a user. Thus, the association system 1 can increase the advertisement effectiveness.

Furthermore, in the terminal device 100 according to the embodiment, the providing unit 132A provides the browser B11 with the in-app cookie information that is associated with the in-app browser that is the browser included in the application A11 together with the terminal information.

Consequently, the terminal device 100 according to the embodiment can appropriately associate the information including the in-app cookie information collected from the same terminal device. Furthermore, the server device 10 can associate the terminal ID, the cookie information, and the in-app cookie information.

Furthermore, in the server device 10 according to the embodiment, the application A11 instructs the browser B11 to access the predetermined server device 10 as a predetermined process.

Consequently, the terminal device 100 according to the embodiment can appropriately associate cookie information that is associated with the server device 10. Furthermore, the terminal device 100 according to the embodiment can appropriately associate the information collected from the same terminal device.

Furthermore, the terminal device 100 according to the embodiment includes the application A11 (130A) and the browser B11 (130B). The browser B11 includes the providing unit 132B that provides the application A11 that is instructed by the browser B11 to perform the predetermined process with the cookie information that is associated with the predetermined server device 10. Furthermore, the application A11 includes the sending unit 135A that sends, to the predetermined server device 10, the cookie information that is provided by the providing unit 132B and the terminal information that is acquired by the application A11.

Consequently, the terminal device 100 according to the embodiment can appropriately associate the information collected from the same terminal device. Furthermore, the server device 10 associates the terminal ID with the cookie information. For example, the server device 10 provides the association information to an external information processing apparatus, for example, the advertisement distribution device included in the association system 1. Consequently, the association system 1 can perform an appropriate advertisement distribution with respect to a user. Consequently, the association system 1 can increase the advertisement effectiveness. Furthermore, the server device 10 may also be an advertisement distribution device that performs an advertisement distribution on the basis of the association information. Consequently, the association system 1 can perform an appropriate advertisement distribution with respect to a user. Thus, the association system 1 can increase the advertisement effectiveness.

Furthermore, in the terminal device 100 according to the embodiment, the sending unit 135A sends the in-app cookie information that is associated with the in-app browser that is the browser included in the application A11 to the predetermined server device 10 together with the terminal information.

Consequently, the terminal device 100 according to the embodiment can appropriately associates information including the in-app cookie information collected from the same terminal device. Furthermore, the server device 10 associates the terminal ID, the cookie information, and the in-app cookie information.

Furthermore, in the server device 10 according to the embodiment, the providing unit 132B provides the cookie information that is associated with the server device 10 that is accessed by the browser B11.

Consequently, the terminal device 100 according to the embodiment can appropriately associate the cookie information that is associated with the server device 10. Furthermore, the terminal device 100 according to the embodiment can appropriately associate the information collected from the same terminal device.

8. Hardware Configuration

Figure 14:
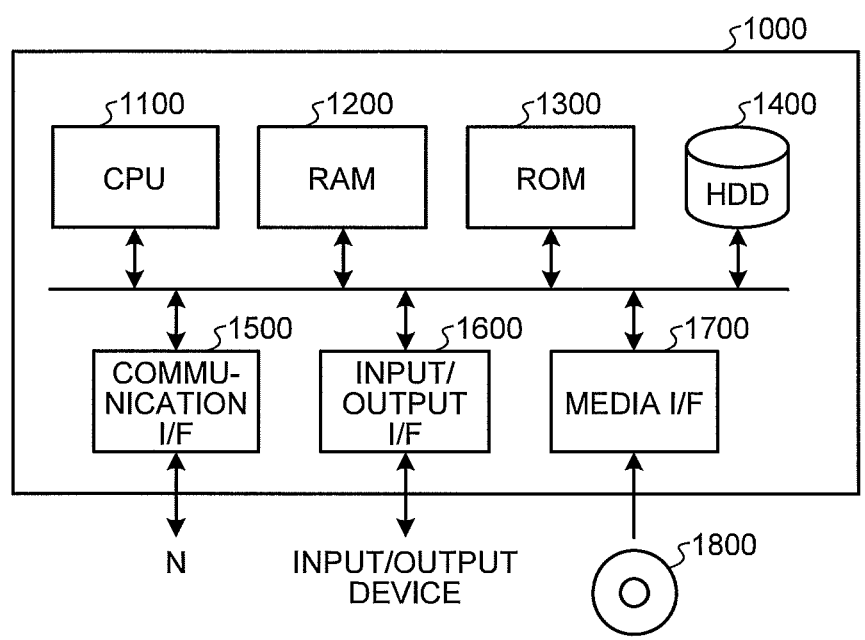
FIG. 14 is a diagram illustrating an example of hardware configuration of a computer that implements the function performed by the terminal device.

The server device 10 according to the embodiment described above is implemented by a computer 1000 having the configuration illustrated in, for example, FIG. 14. FIG. 14 is a diagram illustrating an example of hardware configuration of the computer 1000 that implements the function performed by the terminal device 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400 and controls each of the units. The ROM 1300 stores therein a boot program that is executed by the CPU 1100 when the computer 1000 is started up, a program that depends on the hardware of the computer 1000, or the like.

The HDD 1400 stores therein a program executed by the CPU 1100, data that is used by the program, or the like. The communication interface 1500 receives data from other devices via the network N, sends the data to the CPU 1100, and sends data created by the CPU 1100 to other devices.

The CPU 1100 controls, via the input/output interface 1600, an output device, such as a display or a printer, and an input device, such as a keyboard or a mouse. The CPU 1100 acquires data from the input device through the input/output interface 1600. Furthermore, the CPU 1100 outputs the created data to the output device through the input/output interface 1600.

The media interface 1700 reads a program or data stored in a recording medium 1800 and provides the program or the data to the CPU 1100 via the RAM 1200. The CPU 1100 loads the program on the RAM 1200 from the recording medium 1800 via the media interface 1700 and executes the loaded program. The recording medium 1800 is, for example, an optical recording medium, such as a digital versatile disc (DVD) or a phase change rewritable disk (PD), a magneto-optical recording medium, such as a magneto-optical disk (MO), a tape medium, a magnetic recording medium, or a semiconductor memory.

For example, when the computer 1000 functions as the server device 10 according to the embodiment, the CPU 1100 of the computer 1000 executes the program loaded in the RAM 1200 to implement the functions of the control unit 130. The CPU 1100 in the computer 1000 reads the programs from the recording medium 1800 and executes the programs. Alternatively, the CPU 1100 may also acquire the programs from other devices via the network N.

In the above, embodiments of the present invention have been described; however the embodiments are described only by way of an example. In addition to the embodiments in disclosure of invention, the present invention can be implemented in a mode in which various modifications and changes are made in accordance with the knowledge of those skilled in the art.

9. Others

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, each of the embodiments described above can be appropriately used in combination as long as the processes do not conflict with each other.

Furthermore, the "components (sections, modules, units)" described above can be read as "means", "circuits", or the like. For example, the accepting unit can be read as an accepting means or an accepting circuit.

According to an aspect of an embodiment, an advantage is provided in that information collected from the same terminal device can appropriately be associated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device comprising:
a memory including a first memory region storing terminal identification that identifies the terminal device, and a second memory region;
an application that is unable to access the second memory region; and
a browser, which is different than the application, that is unable to access the first memory region, wherein:
the application includes an application processor programmed to:
access the first memory region and acquire the terminal identification that identifies the terminal device, and
provide the browser that is instructed by the application to perform a predetermined process with the terminal identification that identifies the terminal device and that is acquired by the application,
the browser includes a browser processor programmed to:
generate cookie information that is associated with a predetermined server device identified by the application, and
send the terminal identification provided by the application and the generated cookie information that is associated with the predetermined server device to the identified predetermined server device, and
the terminal identification is stored in the first memory region, which is inaccessible by the browser, and the cookie information is stored in the second memory region, which is inaccessible by the application.

2. The terminal device according to claim 1, wherein the application processor is programmed to provide the browser with in-app cookie information, together with the terminal information, that is associated with an in-app browser that is a browser included in the application.

3. The terminal device according to claim 1, wherein the application instructs the browser to access the predetermined server device as the predetermined process.

4. A terminal device comprising:
a including a first memory region storing terminal identification that identifies the terminal device, and a second memory region;
an application that is unable to access the second memory region; and
a browser, which is different than the application, that is unable to access the first memory region, wherein:
the browser includes a browser processor programmed to: (i) generate cookie information that is associated with a predetermined server device identified by the application, and (ii) provide the application that is instructed by the browser to perform a predetermined process with the generated cookie information that is associated with the identified predetermined server device,
the application includes an application processor programmed to: (i) access the first memory region and acquire the terminal identification that identifies the terminal device, and (ii) send the cookie information provided by the browser and the terminal identification that identifies the terminal device and is acquired by the application to the identified predetermined server device, and
the terminal identification is stored in the first memory region, which is inaccessible by the browser, and the cookie information is stored in the second memory region, which is inaccessible by the application.

5. The terminal device according to claim 4, wherein the application processor is programmed to send, together with the terminal information, in-app cookie information that is associated with an in-app browser that is a browser included in the application to the predetermined server device.

6. The terminal device according to claim 4, wherein the browser processor is programmed to provide the cookie information that is associated with the predetermined server device that is accessed by the browser.

7. An information transmission method executed by a terminal device that includes a memory including a first memory region storing terminal identification that identifies the terminal device, and a second memory region, an application that is unable to access the second memory region, and a browser, which is different than the application, that is unable to access the first memory region, the information transmission method comprising:
- accessing, performed by the application, the first memory region and acquiring the terminal identification that identifies the terminal device;
- providing, performed by the application, the browser that is instructed by the application to perform a predetermined process with the terminal identification that identifies the terminal device and that is acquired by the application;
- generating, performed by the browser, cookie information that is associated with a predetermined server device identified by the application; and
- sending, performed by the browser, the terminal identification provided by the application and the generated cookie information that is associated with the predetermined server device to the identified predetermined server device, wherein:
  - the terminal identification is stored in the first memory region, which is inaccessible by the browser, and the cookie information is stored in the second memory region, which is inaccessible by the application.

8. An information transmission method executed by a terminal device that includes a memory including a first memory region storing terminal identification that identifies the terminal device, and a second memory region, an application that is unable to access the second memory region, and a browser, which is different than the application, that is unable to access the first memory region, the information transmission method comprising:
- generating, performed by the browser, cookie information that is associated with a predetermined server device identified by the application;
- providing, performed by the browser, the application that is instructed by the browser to perform a predetermined process with the generated cookie information that is associated with the identified predetermined server device;
- accessing, performed by the application, the first memory region and acquiring the terminal identification that identifies the terminal device;
- sending, performed by the application, the cookie information provided by the browser and the terminal identification that identifies the terminal device and is acquired by the application to the identified predetermined server device, wherein:
  - the terminal identification is stored in the first memory region, which is inaccessible by the browser, and the cookie information is stored in the second memory region, which is inaccessible by the application.

9. A non-transitory computer-readable recording medium having stored therein an information transmission program that causes a terminal device to execute a process comprising:
- accessing a first memory region of a memory and acquiring terminal identification that identifies the terminal device stored in the first memory region, the memory including the first memory region and a second memory region;
- acquiring the terminal identification that identifies the terminal device and that is provided by an application, which is unable to access the second memory region;
- generating, performed by a browser, cookie information that is associated with a predetermined server device identified by the application, the browser being different than the application and being unable to access the first memory region;
- sending the terminal identification acquired at the acquiring and the generated cookie information, provided by the browser, that is associated with the identified predetermined server device to the predetermined server device wherein:
  - the terminal identification is stored in the first memory region, which is inaccessible by the browser, and the cookie information is stored in the second memory region, which is inaccessible by the application.

10. A non-transitory computer-readable recording medium having stored therein an information transmission program that causes a terminal device to execute a process comprising:
- accessing a first memory region of a memory and acquiring terminal identification that identifies the terminal device stored in the first memory region, the memory including the first memory region and a second memory region;
- generating, performed by a browser, cookie information that is associated with a predetermined server device identified by an application, the application being unable to access the second memory region, the browser being different than the application and being unable to access the first memory region;
- acquiring the generated cookie information that is associated with the identified predetermined server device and that is provided by the browser; and
- sending the generated cookie information acquired at the acquiring and the terminal identification, provided by the application, that identifies the terminal device to the identified predetermined server device, wherein:
  - the terminal identification is stored in the first memory region, which is inaccessible by the browser, and the cookie information is stored in the second memory region, which is inaccessible by the application.

* * * * *